United States Patent [19] [11] 4,346,144
Craven [45] Aug. 24, 1982

[54] POWDER COATING COMPOSITION FOR AUTOMOTIVE TOPCOAT

[75] Inventor: James M. Craven, Wilmington, Del.

[73] Assignee: E. I. Du Pont de Nemours and Company, Wilmington, Del.

[21] Appl. No.: 170,868

[22] Filed: Jul. 21, 1980

[51] Int. Cl.³ .................. C08L 63/08; C08L 61/28; C08L 63/10
[52] U.S. Cl. .................. 428/335; 525/117; 525/124; 525/161; 525/934; 524/904; 524/91; 524/517; 523/461; 523/454
[58] Field of Search ............ 525/934, 124, 161, 117, 525/385; 260/45.8 N, 45.75 N, 45.85 B, 45.95 F, 29.1 SB; 428/335

[56] References Cited

U.S. PATENT DOCUMENTS

| | | | |
|---|---|---|---|
| 3,730,930 | 5/1973 | Labana | 525/934 |
| 3,781,380 | 12/1973 | Labana | 525/934 |
| 3,845,010 | 10/1974 | Labana | 525/117 |
| 3,978,153 | 8/1976 | Sato | 525/934 |
| 3,993,849 | 11/1976 | Victorius | 525/124 |
| 3,998,768 | 12/1976 | Pettit | 525/124 |
| 4,028,326 | 6/1977 | Golovoy | 525/117 |
| 4,042,645 | 8/1977 | Hirota | 525/117 |
| 4,091,049 | 5/1978 | Labana | 525/117 |
| 4,093,674 | 6/1978 | Tsuysui | 525/124 |
| 4,131,571 | 12/1978 | Crawley | 260/17 R |
| 4,137,277 | 1/1979 | Nordstrom | 525/117 |
| 4,184,025 | 1/1980 | Chattha | 525/161 |
| 4,215,204 | 7/1980 | Chattha | 525/161 |
| 4,237,241 | 12/1980 | Chattha | 525/161 |
| 4,246,368 | 1/1981 | Murase | 525/124 |
| 4,281,076 | 7/1981 | Kamimura | 525/934 |

FOREIGN PATENT DOCUMENTS 52-53942 4/1977 Japan .
54-03129 1/1979 Japan .

*Primary Examiner*—Paul Lieberman
*Attorney, Agent, or Firm*—Hilmar L. Fricke

[57] ABSTRACT

A thermosetting acrylic powder coating composition contains an acrylic copolymer of a monoethylenically unsaturated monomer having at least one epoxy group and at least one monoethylenically unsaturated monomer which is free of epoxy groups, a carboxy-terminated primary crosslinking agent, a supplementary crosslinking agent having at least one functional group which can react with either hydroxyl groups or carboxylic acid groups, and at least one ultraviolet light stabilizer or ultraviolet light screener capable of preventing degradation of the coating by ultraviolet light. An acrylic copolymer of methyl methacrylate, n-butyl methacrylate, and glycidyl methacrylate is favored. Preferably, the composition contains a combination of ultraviolet light stabilizer and ultraviolet light screener, is nonpigmented, and provides a clear, glossy, and durable film useful as the clear coat of a clear coat/color coat automobile finish.

17 Claims, No Drawings

POWDER COATING COMPOSITION FOR AUTOMOTIVE TOPCOAT

BACKGROUND OF THE INVENTION

Much of the research and development effort in the field of automotive finishes is currently directed to the search for coating compositions and methods of applying such compositions which not only will eliminate, or nearly eliminate, the release of organic solvents during heat curing but also will produce at a commercially feasible cost, coatings at least comparable in appearance and durability to conventional coatings.

A substantial amount of current research effort is likewise directed to the development of clear coat/color coat automotive finishes. It has been found that an excellent appearance, with depth of color and with metallic glamour, can be obtained by applying a transparent coat over a pigmented coat. Unfortunately, the durability of these transparent clear coats has left much to be desired. Often, checking, cracking, and flaking occur after relatively short periods of exposure to weathering, necessitating costly refinishing.

One solution to the solvent emission problem has been the replacement of liquid coating materials with coating materials in the form of dry, particulate solids, commonly called "powder" coatings. These compositions contain very low concentrations of volatile solvents, i.e., of the order of 2 percent or slightly higher, substantially less than any other paint system.

From an environmental standpoint, powder coatings have much to recommend them. Inherent in their use, however, are certain problems of production and application which have retarded the extent of their adoption. One problem occurs when powder coatings are used in conjunction with particulate metal particles, e.g., aluminum flakes. Automobiles coated with a so-called "metallic" finish, i.e., a topcoat of enamel or lacquer in which aluminum flakes as well as conventional pigments have been dispersed, have found wide acceptance in the marketplace. For the most part, the problems incidental to employing aluminum flakes in conventional liquid paints have been solved through years of experimentation and use. The problems associated with the use of aluminum flakes in dry powder are far more complex, particularly where some type of pulverizing step is involved in the paint manufacturing process or where electrostatic spray techniques are used to apply the paint to a substrate. Also, although increased use of powder coatings and improved manufacturing methods will undoubtedly result in a reduction of the present cost of quality powder coatings, the cost of producing such coatings in all of the colors demanded in the marketplace may continue to be prohibitive.

In view of the problems associated with colored powder coatings, particularly those containing metallic flakes, one approach has been to utilize a clear coat/color coat system wherein the transparent clear coat is composed of a nonpigmented powder coating while the color coat, often metallic, is composed of a conventional liquid paint. Such a system possesses a number of advantages. Use of a powder coating for the clear coat reduces the solvent emission level considerably, and, if desired, a water-based or high-solids coating material can be used for the color coat in order to further reduce the total emission level. Thus, an environmentally-acceptable finish can be achieved without sacrificing appearance or metallic glamour. Too, the production of nonpigmented powder coatings is markedly less complex and less expensive than the production of pigmented powder coatings.

Clear coat/color coat systems consisting of a powder clear coat over a conventional liquid color cost are known in the art, as shown by Camelon et al., U.S. Pat. No. 3,953,644, issued Apr. 27, 1976. However, such systems are not reinforced against the destructive effects of outdoor weathering and are thus susceptible to the checking, cracking, and flaking which commonly beset clear coats.

Conventional ultraviolet light screeners have sometimes been added to liquid clear coats in an attempt to retard the degradation caused by weathering, as shown by La Berge, U.S. Pat. No. 3,407,156, issued Oct. 22, 1968. Many of these conventional screeners are unsuitable for use in a powder coating because they lack special requirements, e.g., the capability of being ground to small particle size, of melting readily at the standard bake temperature for powder finishes, or of having sufficient permanence to remain in the coating film during baking and subsequent outdoor exposure. In addition, the use of conventional ultraviolet light screeners is in some polymer systems less than satisfactory: the durability of certain clear coats so reinforced will be increased for a short period of time, but not to the extent required for a practical automotive finish.

Among the acrylic polymers which provide high quality automotive finishes are those containing glycidyl methacrylate. The use of glycidyl methacrylate in powder coating compositions is known in the art, as shown by Victorius, U.S. Pat. No. 4,027,066, issued May 31, 1977. These compositions, like the aforementioned powder clear coats of the art, are not reinforced against weathering. Furthermore, these compositions are ordinarily pigmented and contain cellulose acetate butyrate, useful as a dispersant for the organic pigments commonly encountered in powder coatings. While cellulose acetate butyrate imparts goniochromatism, i.e., metallic two-tone, to a metallic colored automotive finish, it is less suitable for nonpigmented finishes. The presence of cellulose acetate butyrate in an acrylic system creates a faint cloudiness or haze which is of no consequence in pigmented coats but can be detected in nonpigmented coats and detracts from the overall appearance of the finish. The presence of cellulose acetate butyrate also tends to have a somewhat detrimental effect upon the cold/crack resistance and the outdoor durability of a coating.

Thus, there exists a felt need for a nonpigmented acrylic powder coating composition which will provide a clear coat characterized by both excellent appearance and the capability to adequately withstand long periods of outdoor weathering. In particular, there is need for an acrylic powder coating possessing the attributes of the known glycidyl methacrylate powder coatings but overcoming their deficiencies in order to provide a clear coat finish with excellent cold/crack resistance and superior clarity and durability.

SUMMARY OF THE INVENTION

There is provided by the present invention a thermosetting powder coating composition of finely divided particles having a particle size of about 1 to 100 microns, wherein the particles are an intimately mixed blend consisting essentially of:

A. an acrylic copolymer consisting essentially of:

(1) about 8 to 35 percent by weight, based on the weight of the copolymer, of a monoethylenically unsaturated monomer having at least one epoxy group, and (2) about 65 to 92 percent by weight, based on the weight of the copolymer, of at least one monoethylenically unsaturated monomer which is free of epoxy groups, wherein the copolymer has a number average molecular weight of about 1,500 to 10,000, a weight average molecular weight of about 3,000 to 18,000, and a glass transition temperature of about 30° C. to 100° C.;

B. a carboxy-terminated crosslinking agent in an amount sufficient to provide 0.9–1.5 carboxylic acid groups for each epoxy group originally in the copolymer;

C. a supplementary crosslinking agent having at least one functional group which is capable of reacting with either hydroxyl groups or carboxylic acid groups, said supplementary crosslinking agent being present in an amount sufficient to provide 0.1–0.7 functional group for each epoxy group originally in the copolymer; and D. at least one agent capable of preventing the degradation of the coating by ultraviolet light.

DETAILED DESCRIPTION OF THE INVENTION

The thermosetting acrylic powder coating composition of the present invention, particularly suitable for use as the clear coat of a clear coat/color coat automotive finish, provides coatings possessing a combination of resistance to outdoor weathering, smoothness, distinctness of image, and a high level of gloss, a combination that has heretofore only been available in liquid clear coats. These properties are obtained without sacrifice of storage stability, hardness, or humidity/cold crack resistance.

The powder coating composition is composed of an acrylic copolymer of monoethylenically unsaturated monomers, primary and secondary crosslinking agents, and one or more ultraviolet light stabilizers or screeners. It can also contain a reaction catalyst to decrease the curing time, as well as any of the various additives that are advantageously used in automotive coating compositions.

The coating composition of this invention contains an acrylic polymer having a glass transition temperature of about 30° C. to 100° C., and preferably 40° C. to 70° C. This glass transition temperature results in a storage-stable, free-flowing powder which will flow upon baking to form an exceptionally smooth and glossy finish.

The coating composition of this invention is in the form of powder particles with a particle size, or average linear dimension, of about 1 to 100 microns and preferably, to provide a high quality finish, a particle size of 10 to 75 microns. While the powder particles will ordinarily be nonpigmented, it is acceptable, for clear coat use, to incorporate transparent particles, i.e., pigments having a refractive index the same as or similar to the refractive index of the film-forming constituents. Such pigments should have a particle size of about 0.015 to 50 microns and should be used in a pigment-to-powder weight ratio of about 1/10 to 1/100. Conventional pigments, e.g., inorganic pigments, metallic powders and flakes, organic dyes, organic pigments, and lakes, may also be added, in these same weight ratios, if the coating composition is to be employed other than as the clear coat of a clear coat/color coat finish.

The acrylic copolymer utilized in the powder coating composition of this invention has a number average molecular weight of about 1,500 to 10,000, preferably 3,000 to 7,500, and a weight average molecular weight of about 3,000 to 18,000, preferably 6,000 to 14,000. The number average molecular weight and the weight average molecular weight of the copolymer are determined by gel permeation chromatography, in tetrahydrofuran, using as a standard polymethyl methacrylate having a number average molecular weight of 43,000 and a weight average molecular weight of 100,000.

The acrylic copolymer is prepared by conventional solution, emulsion, or bead polymerization techniques, and by using conventional polymerization catalysts. Preferred is bead polymerization, as disclosed in W. R. Sorenson and T. W. Campbell, *Preparative Methods of Polymer Chemistry*, Interscience Publishers, New York, second edition, 1968, page 254. Preparation of the copolymer is discussed in greater detail in the examples, infra.

Generally, the acrylic copolymer consists of about 8 to 35 percent by weight, based on the weight of the copolymer, of a monoethylenically unsaturated monomer having at least one epoxy group and about 65 to 92 percent by weight of one or more monoethylenically unsaturated monomers having no epoxy groups.

Preferred monoethylenically unsaturated monomers having at least one epoxy group are the esters of an epoxide-containing alcohol and a monoethylenically unsaturated acid. These esters have the formula

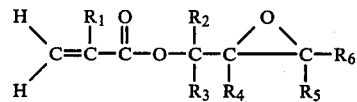

where $R_1$–$R_6$ can be the same or different and are each hydrogen or an aliphatic or aromatic hydrocarbon radical having 1 to 6 carbon atoms. More preferred are esters of this formula where $R_1$ and $R_4$ are each hydrogen or the methyl radical and $R_2$, $R_3$, $R_5$ and $R_6$ are each hydrogen. Even more preferred are esters of this formula where $R_2$–$R_6$ are each hydrogen and $R_1$ is either hydrogen or the methyl radical, i.e., glycidyl acrylate or glycidyl methacrylate. Glycidyl methacrylate is most preferred.

Preferred monoethylenically unsaturated monomers having no epoxy groups are styrene and esters of acrylic or methacrylic acid having the formula

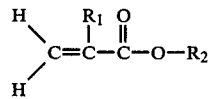

where $R_1$ is hydrogen or the methyl radical and $R_2$ is an aliphatic or aromatic hydrocarbon radical having 1 to 20 carbon atoms. Preferably, $R_2$ is an aliphatic hydrocarbon radical having 1 to 12 carbon atoms. Two highly preferred monoethylenically unsaturated monomers having no epoxy groups are methyl methacrylate and n-butyl methacrylate.

Durable high quality automotive finishes are provided by powder coating compositions that contain an acrylic copolymer of methyl methacrylate, n-butyl methacrylate, and glycidyl methacrylate. A copolymer composed of about 30 to 72 percent by weight of methyl methacrylate, 20 to 45 percent by weight of n-butyl methacrylate, and 8 to 35 percent by weight of glycidyl methacrylate is effective in the coating composition of this invention, although a copolymer of 45 to 55 percent by weight of methyl methacrylate, 30 to 38 percent by weight of n-butyl methacrylate, and 12 to 20 percent by weight of glycidyl methacrylate is preferred. A highly recommended and particularly useful copolymer contains about 50 percent by weight of methyl methacrylate, 34 percent by weight of n-butyl methacrylate, and 16 percent by weight of glycidyl methacrylate.

The primary crosslinking agent for the acrylic copolymer is carboxy-terminated and is preferably an aromatic or aliphatic carboxylic acid having 2 to 3 carboxylic acid groups per molecule, or a mixture of monocarboxylic, dicarboxylic, or tricarboxylic acids having a average of 1.5–3.0 carboxylic acid groups per molecule. Linear aliphatic dicarboxylic acids are preferred, particularly those having the formula $$HOOC-(CH_2)_n-COOH$$

where n is an integer between 4 and 20 or, more preferably, between 8 and 18. Most highly recommended is dodecanedioic acid. The primary crosslinking agent must be present in an amount sufficient to provide 0.9 to 1.5 carboxylic acid groups for each epoxy group in the copolymer.

A secondary crosslinking or modifying agent for the copolymer, possessing at least one functional group that is capable of reacting either with hydroxyl groups or with carboxylic acid groups, is present in an amount sufficient to provide 0.1 to 0.7 functional group for each epoxy group in the copolymer. Agents capable of reacting with hydroxyl groups are preferred over those reacting with carboxylic acid groups.

A preferred class of supplementary crosslinking or modifying agents that can react with hydroxyl groups consists of blocked isocyanates having an average of 1.5 to 3.5 blocked isocyanate groups per molecule. The isocyanate is preferably an aliphatic diisocyanate, a trimer of an aliphatic diisocyanate, or an adduct of an aliphatic diisocyanate with a difunctional or trifunctional aliphatic alcohol. The blocking agent is preferably caprolactam or methyl ethyl ketoxime. A second preferred class of agents that can react with hydroxyl groups consists of alkylated melamine formaldehyde resins and alkylated glycoluril resins.

Somewhat less preferred are supplementary crosslinking or modifying agents that can react with carboxylic acid groups. Of these, a preferred class consists of compounds containing one or more epoxy groups. Particularly useful are hydantoin epoxides containing 2 to 4 epoxide groups, triglycidylisocyanurate, aliphatic glycidyl ethers, aliphatic glycidyl esters, cycloaliphatic epoxides, and epoxy resins derived from hydrogenated bisphenol-A and epichlorohydrin.

Preferred hydantoin epoxides are those having one of the following formulas

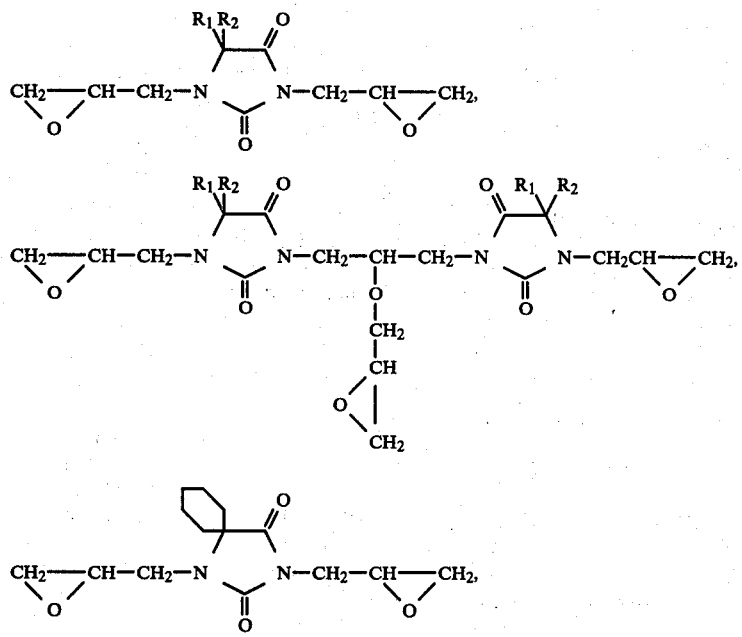

where $R_1$ and $R_2$ are aliphatic hydrocarbon radicals having 1 to 10 carbon atoms.

Preferred aliphatic glycidyl ethers are those having the formula

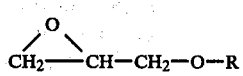

where R is an aliphatic hydrocarbon radical having 1 to 20 carbon atoms.

Preferred aliphatic glycidyl esters are those having the formula

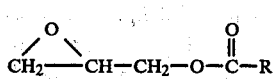

where R is an aliphatic hydrocarbon radical having 1 to 20 carbon atoms.

Preferred cycloaliphatic epoxides are those having either of the following formulas

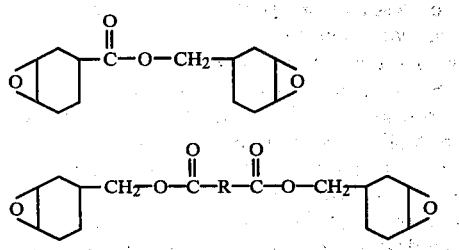

where R is a bivalent aromatic hydrocarbon radical having 6 to 10 carbon atoms or a bivalent aliphatic hydrocarbon radical having 2 to 20 carbon atoms.

Preferred epoxy resins derived from hydrogenated bisphenol-A and epichlorohydrin are those having the formula

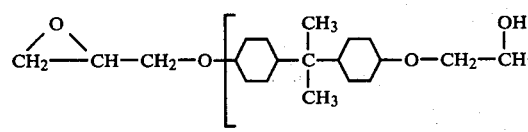

where n is an integer from 0 to 10.

Another preferred class of supplementary crosslinking or modifying agents that react with carboxylic acid groups consists of disubstituted oxazolines and trisubstituted oxazolines. Preferred are those with the formula

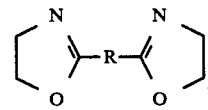

where R is a bivalent aliphatic hydrocarbon radical having 2 to 20 carbon atoms or a bivalent aromatic hydrocarbon radical having 6 to 10 carbon atoms.

Still another preferred class of supplementary crosslinking or modifying agents that react with carboxylic acid groups consists of difunctional, trifunctional, or tetrafunctional β-hydroxyalkylamides, of the type disclosed in Swift et al., U.S. Pat. No. 4,076,917, issued Feb. 21, 1978.

The powder coating composition of the present invention is fortified with at least one ultraviolet light stabilizer or screener to prevent degradation of the resultant finish by ultraviolet light. Highly preferred for this purpose is a combination of an ultraviolet screener and a hindered amine light stabilizer. The powder coating composition contains about 0.3 to 6 percent by weight, based on the total weight of the composition, of this combination, preferably about 0.5 to 2 percent by weight of a hindered amine light stabilizer and about 1 to 3 percent by weight of an ultraviolet screener. Both the ultraviolet screener and the hindered amine light stabilizer should have a weight average molecular weight greater than 300 and a particle size of less than 40 microns. Preferred ultraviolet screeners are 2-(o-hydroxyphenyl)benzotriazoles, nickel chelates, o-hydroxybenzophenones, or phenyl salicylates. Most preferred are the 2-(o-hydroxyphenyl)benzotriazoles. The hindered amine light stabilizer can be either monomeric or polymeric, although the latter are preferred from a permanence standpoint.

Hindered amine light stabilizers provide greater efficiency at economical use levels than, for instance, nickel organics and benzophenones. It has been estimated that as much as four times longer product life can be expected from products reinforced with the hindered amines than from products reinforced with conventional ultraviolet screeners and stabilizers. Despite their good light stabilization characteristics, hindered amine light stabilizers are nevertheless more effective in many polymer systems when used in conjunction with certain conventional ultraviolet screeners. The combination of a hindered amine light stabilizer and an o-hydroxyphenyl benzotriazole is preferred for use in the coating compositions of the present invention, and is especially preferred in those compositions containing an acrylic copolymer of methyl methacrylate, n-butyl methacrylate, and glycidyl methacrylate. An apparent synergistic

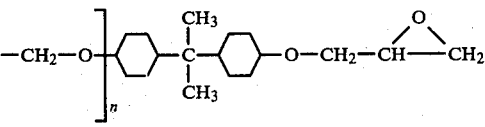

effect resulting from the combination of the hindered amine light stabilizer and the o-hydroxyphenyl benzotriazole imparts exceptional durability to the clear powder coat of this invention.

The coating composition of this invention may contain a reaction catalyst to decrease the curing time. Preferred catalysts include tin catalysts, e.g., stannous octoate, for blocked isocyanate systems, and strong acids, e.g., p-toluenesulfonic acid, for systems containing dimethoxymethyldiethoxymethylglycoluril, hexamethoxymethylmelamine, and other melamine-formaldehyde resins. Strong acid catalysts are preferably blocked with an epoxide or an amine. The catalysts will ordinarily be present in an amount up to about 2 percent by weight, based on the weight of the film-forming blend.

The coating composition may also contain certain other additives that are typically incorporated into powder coating compositions. Particularly recommended are antipopping agents, which allow volatiles to gently escape from the film during baking, and flow control agents, which prevent cratering of the finish. Benzoin is the highly preferred antipopping agent and is present in an amount ranging from about 0.05 percent by weight to 1.0 percent by weight, based on the weight of the total powder composition. The flow control agent is present in an amount ranging from about 0.05 percent by weight to 5.0 percent by weight. One preferred flow control agent is alkylene oxide modified dimethyl polysiloxane fluid. Other useful flow control agents include those disclosed in Labana et al., U.S. Pat. Nos. 4,091,048 and 4,091,049, issued May 23, 1978, e.g., acrylic polymers such as polylauryl acrylate, polybutyl acrylate, poly(2-ethylhexyl acrylate), polylauryl methacrylate, and polyisodecyl methacrylate, and fluorinated polymers such as the esters of polyethylene glycol or polypropylene glycol, and fluorinated fatty acids.

The powder coating composition of this invention can be applied directly to a metal, glass, plastic, or fiber-reinforced plastic substrate or to one which has been primed and/or sealed in a conventional manner.

An electrically conductive carbon black pigment may be added to the primer or sealer to make the surface conductive and to promote uniform deposition of the powder during spraying. Application of the powder can be by electrostatic spraying or by use of a fluidized bed. Preferred is electrostatic spraying wherein a negative charge of 20 to 100 kilovolts is applied to the spray gun. The powder composition can be applied either in one pass or in several passes to provide a film thickness, after cure, of about 0.5 to 5 mils. Preferably, to provide a high quality finish of reasonable cost, the thickness of the clear powder coat is about 1.2 to 2 mils and, more preferably, 1.4 to 2 mils.

The substrate to be coated can, optionally, be preheated prior to the application of the powder to promote more uniform powder deposition. Upon application of the powder, the powder-coated substrate is baked at 250° F. to 350° F. for 20 to 60 minutes. Preferred for the powder coating composition of the present invention is a staged bake, wherein the powder-coated substrates are baked for 10 minutes at 250° F., another 10 minutes at 300° F., and then for 30 minutes at 350° F.

The present invention will be more fully understood from the following illustrative examples, wherein all quantities, percentages, and ratios are on a weight basis unless otherwise indicated.

EXAMPLE 1

| Preparation of Acrylic Copolymer | |
|---|---|
| Methyl methacrylate monomer | 50.00 |
| n-Butyl methacrylate monomer | 34.00 |
| Glycidyl methacrylate monomer | 16.00 |
| Water | 100.00 |
| Lauryl mercaptan | 4.25 |
| Vazo ® 52 polymerization initiator (registered trademark of E. I. du Pont de Nemours and Company) | 0.75 |
| Acrysol A-3 surfactant (available from Rohm and Haas Company) (25% solution in water) | 0.75 |
| | 205.75 |

The acrylic copolymer is prepared using bead polymerization techniques by stirring the above components at about 175° F. to 190° F. for one hour. The copolymer is isolated by filtration, washed with water, and dried.

| Preparation of Powder Coating Composition | |
|---|---|
| Acrylic copolymer | 82.33 |
| Dodecanedioic acid (6 micron average particle size) | 9.67 |
| A blocked isocyanate derived from Hylene ® W organic isocyanate (registered trademark of E. I. du Pont de Nemours and Company) wherein 48% of the NCO has been reacted with trimethylolpropane and the remaining NCO has been reacted with caprolactam | 8.00 |
| Benzoin (6 micron average particle size) | 0.50 |
| Alkylene oxide modified diemthyl polysiloxane fluid | 0.50 |
| Stannous octoate | 0.10 |
| CGL-900 o-hydroxyphenylbenzotriazole ultraviolet absorber (available from Ciba-Geigy Corporation) (7 micron average particle size) | 2.00 |
| Tinuvin 622 hindered amine light stabilizer (available from Ciba-Geigy Corporation) (10 micron average particle size) | 1.00 |
| | 104.00 |

The above components are mixed for 45 minutes in a planetary mixer, then blended for 10 minutes at 200° F. on a 2-roll mill. The resulting chips are ground in a pin mill, and the resulting powder is then jet-sieved through a 270 mesh screen.

The powder clear coating composition thus prepared is electrostatically sprayed over a color-coated automotive substrate and baked for 10 minutes at 250° F., 10 minutes at 300° F., and 30 minutes at 350° F.

The resultant coating exhibits high gloss, a smooth finish, and excellent resistance to weathering.

EXAMPLE 2

| | |
|---|---|
| Acrylic copolymer (as prepared in Example 1) | 83.67 |
| Dodecanedioic acid (6 micron average particle size) | 12.55 |
| Hylene ® W organic isocyanate (registered trademark of E. I. du Pont de Nemours and Company) capped with 2 moles of methyl ethyl ketoxime | 3.78 |
| Benzoin (6 micron average particle size) | 0.50 |
| Alkylene oxide modified dimethyl polysiloxane fluid | 0.50 |
| Stannous octoate | 0.02 |
| CGL-900 (7 micron average particle size) | 2.00 |
| Tinuvin 622 (10 micron average particle size) | 1.00 |
| | 104.02 |

Preparation and application of this powder coating composition follow the procedures outlined in Example 1, and comparable results are obtained. The same holds true for the following examples, except where otherwise indicated.

EXAMPLE 3

| | |
|---|---|
| Acrylic copolymer (as prepared in Example 1) | 85.12 |
| Dodecanedioic acid (6 micron average particle size) | 12.77 |
| Dimethoxymethyldiethoxymethyl glycoluril | 2.11 |
| Benzoin (6 micron average particle size) | 0.50 |
| Alkylene oxide modified dimethyl polysiloxane fluid | 0.50 |
| p-Toluenesulfonic acid | 0.50 |
| Isopropyl alcohol | 2.00 |
| Cycloaliphatic diepoxide | 1.50 |

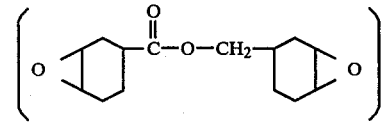

| | |
|---|---|
| CGL-900 (7 micron average particle size) | 2.00 |
| Tinuvin 144 hindered amine light stabilizer (available from Ciba-Geigy Corporation) (5 micron average particle size) | 1.00 |
| | 108.00 |

The p-toluenesulfonic acid is first dissolved in the isopropyl alcohol, after which the cycloaliphatic diepoxide is added, and the resultant mixture is allowed to stand for 1 hour. The remaining components are then added and mixed, as in Example 1.

EXAMPLE 4

| | |
|---|---|
| Acrylic copolymer (as prepared in Example 1) | 85.43 |
| Dodecanedioic acid (6 micron average particle size) | 12.82 |
| Triglycidylisocyanurate (6 micron average | 1.75 |

-continued

| | |
|---|---|
| particle size) | |
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 144 (5 micron average particle size) | 1.00 |
| | 104.00 |

EXAMPLE 5

| | |
|---|---|
| Acrylic copolymer (as prepared in Example 1) | 84.75 |
| Dodecanedioic acid (6 micron average particle size) | 12.71 |
| Hydantoin diepoxide | 2.54 |

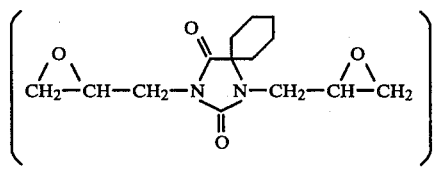

| | |
|---|---|
| (6 micron average particle size) | |
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 622 (10 micron average particle size) | 1.00 |
| | 104.00 |

EXAMPLE 6

| | |
|---|---|
| Acrylic copolymer (as prepared in Example 1) | 85.30 |
| Dodecanedioic acid (6 micron average particle size) | 12.79 |
| m-Phenylenebis(oxazoline) (6 micron average particle size) | 1.91 |
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 144 (5 micron average particle size) | 1.00 |
| | 104.00 |

EXAMPLE 7

| | |
|---|---|
| Acrylic copolymer (as prepared in Example 1) | 84.96 |
| Dodecanedioic acid (6 micron average particle size) | 12.74 |
| Hydroxyalkylamide | 2.29 |

$$\left(\left(\begin{array}{c}CH_3\\|\\HO-CH-CH_2\end{array}\right)_2 NC(CH_2)_4 CN\left(\begin{array}{c}CH_3\\|\\CH_2-CH-OH\end{array}\right)_2\right)$$

| | |
|---|---|
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 144 (5 micron average particle size) | 1.00 |
| | 103.99 |

EXAMPLE 8

| | |
|---|---|
| Acrylic copolymer (as prepared in Example 1) | 82.71 |

-continued

| | |
|---|---|
| Dodecanedioic acid (6 micron average particle size) | 12.41 |
| Aliphatic glycidyl ether | 4.89 |

$$\left(R-O-CH_2-\overset{O}{\overset{/\backslash}{CH-CH_2}}\right)$$
where R is mostly $C_{12}$ and $C_{14}$ alkyl

| | |
|---|---|
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 144 (5 micron average particle size) | 1.00 |
| | 104.00 |

EXAMPLE 9

| | |
|---|---|
| Acrylic copolymer (as prepared in Example 1) | 83.28 |
| Dodecanedioic acid (6 micron average particle size) | 12.50 |
| Cardura E ester (glycidyl ester of an aliphatic acid) (available from Shell Chemical Company) | 4.22 |
| Benzoin (6 micron average particle size) | 0.50 |
| Alkylene oxide modified dimethyl polysiloxane fluid | 0.50 |
| CGL-900 (7 micron average particle size) | 2.00 |
| Tinuvin 144 (5 micron average particle size) | 1.00 |
| | 104.00 |

EXAMPLE 10

| | |
|---|---|
| Acrylic copolymer (as prepared in Example 1) | 85.82 |
| Dodecanedioic acid (6 micron average particle size) | 10.08 |
| Hexamethoxymethylmelamine | 4.09 |
| Benzoin (6 micron average particle size) | 0.50 |
| Alkylene oxide modified dimethyl polysiloxane fluid | 0.50 |
| Isopropyl alcohol | 0.60 |
| p-Toluenesulfonic acid | 0.10 |
| Cycloaliphatic diepoxide (as in Example 3) | 0.30 |
| CGL-900 (7 micron average particle size) | 2.00 |
| CGL-079L hindered amine light stabilizer (available from Ciba-Geigy Corporation) | 2.50 |
| | 104.49 |

The p-toluenesulfonic acid is dissolved in two-thirds (0.40 parts) of the isopropyl alcohol, and the cycloaliphatic diepoxide is dissolved in the remaining isopropyl alcohol. The two portions are then combined and allowed to stand for 1 hour before mixing with the remaining components.

Each of the above examples yields a transparent clear coat finish characterized by excellent appearance and superior weathering properties.

The invention claimed is:

1. A thermosetting powder coating composition of finely divided particles having a particle size of about 1 to 100 microns, wherein the particles are an intimately mixed blend consisting essentially of:
   A. an acrylic copolymer consisting essentially of polymerized monomers of:
      (1) about 8 to 35 percent by weight, based on the weight of the copolymer, of a monoethylenically unsaturated monomer having the formula

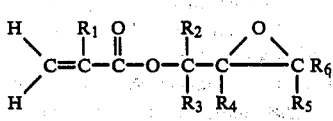

where $R_1$ and $R_4$ are the same or different and are each selected from the group consisting of hydrogen and the methyl radical, and $R_2$, $R_3$, $R_5$, and $R_6$, are hydrogen and (2) about 65 to 92 percent by weight, based on the weight of the copolymer, of at least one monoethylenically unsaturated monomer which is free of epoxy groups selected from the group consisting of (a) styrene;

(b) esters of acrylic or methacrylic acid having the formula

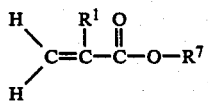

where $R^1$ is selected from the group consisting of hydrogen and the methyl radical, and $R^7$ is selected from the group consisting of $C_1-C_{20}$ aliphatic hydrocarbon radicals and $C_1-C_{20}$ aromatic hydrocarbon radicals.

wherein the copolymer has a number average molecular weight of about 1,500 to 10,000, a weight average molecular weight of about 3,000 to 18,000, and a glass transition temperature of about 30° C. to 100° C;

B. a carboxy-terminated crosslinking agent consisting of an aliphatic dicarboxylic acid having the formula

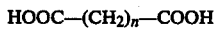

where n is an integer from 8–18; said crosslinking agent being present in an amount sufficient to provide 0.9–1.5 carboxylic acid groups for each epoxy group orginially in the copolymer;

C. a supplementary crosslinking having at least one functional group which is capable of reacting with either hydroxyl groups or carboxylic acid groups, and which will not react until the the carboxylic-terminated crosslinking agent has reacted with the acrylic copolymer said supplementary crosslinking being present in an amount sufficient to provide 0.1–0.7 functional group for each epoxy group originally in the acrylic copolymer and is selected from the group consisting of an alkylated melamine formaldehyde resin, an alkylated glycoluril resin, an aliphatic glycidyl ether having the formula

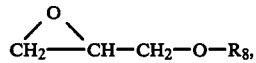

an aliphatic glycidyl ester having the formula

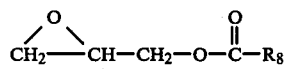

where $R^8$ is selected from the group consisting of the $C_1-C_{20}$ aliphatic hydrocarbon radicals, a cycloaliphatic epoxide having the formula

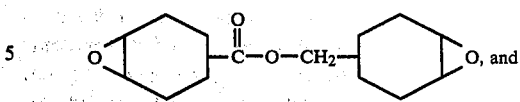

a cycloaliphatic epoxide having the formula

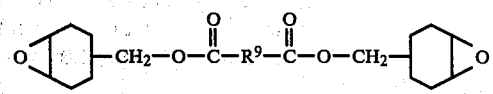

where $R^9$ is selected from the group consisting of bivalent $C_6-C_{10}$ aromatic hydrocarbon radicals and bivalent $C_2-C_{20}$ aliphatic hydrocarbon radicals; and D. at least one agent capable of preventing the degradation of the coating by ultraviolet light wherein the agent has a weight average molecular weight of greater than 300 and a particle size of less than 40 microns.

2. The powder coating composition of claim 1 wherein the monoethylenically unsaturated monomer having at least one epoxy group is glycidyl methacrylate.

3. The powder coating composition of claim 1 in which the acrylic copolymer consists essentially of 45 to 55 percent by weight, based on the weight of the acrylic copolymer, of methyl methacrylate, 30 to 38 percent by weight of n-butylmethacrylate, and 12 to 20 percent by weight of glycidyl methacrylate.

4. The powder coating composition of claim 1 or 3 wherein the carboxy-terminated crosslinking agent is dodecanedioic acid.

5. The powder coating composition of claim 1 wherein a combination of an ultraviolet screener and a hindered amine light stabilizer is employed to prevent the degradation of the coating by ultraviolet light.

6. The powder coating composition of claim 5 wherein the ultraviolet screener is selected from the group consisting of 2-(o-hydroxyphenyl)benzotriazoles, nickel chelates, o-hydroxybenzophenones, and phenyl salicylates.

7. The powder coating composition of claim 6 wherein the ultraviolet screener is a 2-(o-hydroxyphenyl)benzotriazole.

8. The powder coating composition of claim 5 which contains about 1 to 3 percent by weight, based on the weight of the acrylic copolymer, of the ultraviolet screener and about 0.5 to 2 percent by weight of the hindered amine light stabilizer.

9. The powder coating compositions of claim 3 which contains 1 to 3 percent by weight, based on the weight of the acrylic copolymer, of a 2-(o-hydroxyphenyl)benzotriazole and about 0.5 to 2 percent by weight of a hindered amine light stabilizer.

10. The powder coating compositions of claim 3 which contains 1 to 3 percent by weight, based on the weight of the acrylic copolymer, of a 2-(o-hydroxyphenyl)benzotriazole and about 0.5–2 percent by weight of a hindered amine light stabilizer.

11. The powder coating composition of claim 9 containing in addition to the aforementioned constituents up to about 2 percent by weight, based on the weight of the total powder composition, of a blocked strong acid catalyst.

12. The powder coating composition of claim 9 containing in addition to the aforementioned constituents about 0.05 percent by weight to 1.0 percent by weight, based on the weight of the total powder composition, of benzoin.

13. The powder coating composition of claim 9 containing in addition to the aforementioned constituents 0.05 percent by weight to 2.0 percent by weight, based on the weight of the total powder composition, of a flow control agent.

14. The powder coating composition of claim 13 wherein the flow control agent is alkylene oxide modified dimethyl polysiloxane fluid.

15. The powder coating composition of claim 13 wherein the flow control agent is a fluorinated polymer.

16. A substrate coated with a pigmented liquid coating composition and subsequently coated with a transparent powder coating composition according to claim 1 to form a clear coat/color coat finish.

17. The coated article of claim 16 wherein the thickness of the cured powder coating composition is about 1.2 to 2 mils.

* * * * *